(12) United States Patent
Schwendenmann

(10) Patent No.: US 11,047,249 B2
(45) Date of Patent: Jun. 29, 2021

(54) LABYRINTH SEAL WITH PASSIVE CHECK VALVE

(71) Applicant: UNITED TECHNOLOGIES CORPORATION, Farmington, CT (US)

(72) Inventor: Andrew V. Schwendenmann, Wilbraham, MA (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 26 days.

(21) Appl. No.: 16/400,137

(22) Filed: May 1, 2019

(65) Prior Publication Data

US 2020/0347739 A1 Nov. 5, 2020

(51) Int. Cl.
*F01D 11/02* (2006.01)
*F16J 15/447* (2006.01)

(52) U.S. Cl.
CPC ........... *F01D 11/02* (2013.01); *F16J 15/4472* (2013.01); *F16J 15/4476* (2013.01)

(58) Field of Classification Search
None
See application file for complete search history.

(56) References Cited

U.S. PATENT DOCUMENTS

| 1,329,559 | A | * | 2/1920 | Tesla | F15C 1/00 |
| | | | | | 138/37 |
| 2,647,684 | A | * | 8/1953 | Albert | F01D 11/04 |
| | | | | | 417/365 |
| 3,572,728 | A | | 3/1971 | Smuland | |
| 3,779,345 | A | * | 12/1973 | Barnes | F16C 19/52 |
| | | | | | 184/6.4 |
| 3,927,890 | A | * | 12/1975 | Adams, Jr. | F01D 15/005 |
| | | | | | 277/412 |
| 3,940,153 | A | | 2/1976 | Stocker | |
| 4,513,975 | A | | 4/1985 | Hauser et al. | |
| 4,531,358 | A | * | 7/1985 | Smith | F01D 25/20 |
| | | | | | 184/6.11 |

(Continued)

FOREIGN PATENT DOCUMENTS

SU 785575 A1 12/1980
WO 2012052740 A1 4/2012

OTHER PUBLICATIONS

Truong, T. Q., and N. T. Nguyen. "Simulation and optimization of tesla valves." Technical Proceedings of the 2003 Nanotechnology Conference and Trade Show. vol. 1. 2003.

(Continued)

*Primary Examiner* — Woody A Lee, Jr.
(74) *Attorney, Agent, or Firm* — Carlson, Gaskey & Olds, P.C.

(57) ABSTRACT

A gas turbine engine component includes a static component with at least one first flow channel. The labyrinth seal rotates relative to the static component. The labyrinth seal is spaced from the static component by a second flow channel. The flow passing between the labyrinth seal and the static component will have a first portion that travels through the at least one first flow channel and a second portion that travels through the second flow channel with the first portion of the flow being reintroduced into the second flow channel to create a flow restriction.

22 Claims, 3 Drawing Sheets

(56) References Cited

U.S. PATENT DOCUMENTS

| | | | | |
|---|---|---|---|---|
| 5,282,718 | A * | 2/1994 | Koff | F01D 11/08 |
| | | | | 415/57.3 |
| 5,308,225 | A * | 5/1994 | Koff | F01D 11/08 |
| | | | | 415/57.3 |
| 5,431,533 | A * | 7/1995 | Hobbs | F01D 5/145 |
| | | | | 415/145 |
| 5,474,417 | A * | 12/1995 | Privett | F04D 29/526 |
| | | | | 415/173.1 |
| 5,607,284 | A * | 3/1997 | Byrne | F01D 11/08 |
| | | | | 415/173.4 |
| 6,164,655 | A | 12/2000 | Bothien et al. | |
| 8,052,375 | B2 * | 11/2011 | Turnquist | F16J 15/443 |
| | | | | 415/58.5 |
| 8,900,235 | B2 * | 12/2014 | Siegal | A61B 17/1615 |
| | | | | 606/80 |
| 9,145,786 | B2 * | 9/2015 | Wang | F01D 11/04 |
| 9,695,654 | B2 * | 7/2017 | Stephenson | E21B 21/01 |
| 9,874,220 | B2 * | 1/2018 | Adams | F04D 29/08 |
| 10,267,214 | B2 * | 4/2019 | Svihla | F01D 25/24 |
| 2006/0110247 | A1 * | 5/2006 | Nelson | F01D 11/122 |
| | | | | 415/173.4 |
| 2007/0147988 | A1 * | 6/2007 | Ito | F04D 29/124 |
| | | | | 415/169.1 |
| 2009/0297341 | A1 | 12/2009 | Turnquist et al. | |
| 2011/0250073 | A1 | 10/2011 | Neeli | |
| 2013/0341430 | A1 * | 12/2013 | Hall | F02C 7/232 |
| | | | | 239/533.2 |
| 2016/0369925 | A1 | 12/2016 | Munson et al. | |
| 2017/0058689 | A1 * | 3/2017 | Gaebler | F01D 11/127 |
| 2017/0298742 | A1 * | 10/2017 | Johnson | F01D 5/145 |
| 2019/0203689 | A1 * | 7/2019 | Sheldon-Coulson | F03B 13/142 |

OTHER PUBLICATIONS

European Search Report dated Aug. 24, 2020 for EP 20 16 9443.

* cited by examiner

LABYRINTH SEAL WITH PASSIVE CHECK VALVE

BACKGROUND

This application relates to a gas turbine engine that includes a component comprising a labyrinth seal with a passive check valve.

Gas turbine engines are known and typically include a fan delivering air into a bypass duct as bypass air and into a compressor as core air. The air is compressed and delivered into a combustor section where the air is mixed with fuel and ignited. Products of the combustion pass downstream over turbine rotors, which causes the turbine rotors to rotate.

In one known type of gas turbine engine, there are at least two turbine rotors, each driving a compressor rotor. These turbine rotors are supported by a series of bearings. In one example, a labyrinth seal is used to seal a bearing compartment. A labyrinth seal is a close clearance seal that can seal a cavity from both air and oil transfer. Labyrinth seals, which are also referred to as knife edge seals, include a rotating member with sharp points, e.g., knife edges, that rotate in close proximity to a static structure. This close proximity reduces the overall leakage area that is exposed between two cavities. Typically, labyrinth seals are configured to use a naturally forming vortex that occurs directly behind the knife edge to further reduce leakage. However, while labyrinth seals are cost effective and easy to maintain, they are not the most efficient of seals.

SUMMARY

In a featured embodiment, a gas turbine engine component includes a static component with at least one first flow channel. The labyrinth seal rotates relative to the static component. The labyrinth seal is spaced from the static component by a second flow channel. The flow passing between the labyrinth seal and the static component will have a first portion that travels through the at least one first flow channel and a second portion that travels through the second flow channel with the first portion of the flow being reintroduced into the second flow channel to create a flow restriction.

In another embodiment according to the previous embodiment, the labyrinth seal rotates about an engine center axis and wherein the second flow channel comprises a gap that extends circumferentially about the engine center axis.

In another embodiment according to any of the previous embodiments, the labyrinth seal rotates about an engine center axis and wherein the second flow channel comprises a gap that extends circumferentially about the engine center axis.

In another embodiment according to any of the previous embodiments, the labyrinth seal has an outer circumferential surface with a plurality of knives extending radially outwardly of the outer circumferential surface and being axially spaced apart from each other.

In another embodiment according to any of the previous embodiments, the static component has an inner circumferential surface that faces the outer circumferential surface of the labyrinth seal, and wherein the at least one first flow channel is formed in the inner circumferential surface and comprises a curved channel having an inlet that receives the first portion of the flow and an outlet that reintroduces the first portion into the second flow channel.

In another embodiment according to any of the previous embodiments, the inlet and outlet are positioned axially between a pair of adjacent knives.

In another embodiment according to any of the previous embodiments, the at least one first flow channel comprises a plurality of first flow channels that are axially spaced apart from each other along the inner circumferential surface of the static component.

In another embodiment according to any of the previous embodiments, one first flow channel is positioned axially between each pair of adjacent knives.

In another embodiment according to any of the previous embodiments, the at least one first flow channel extends circumferentially about the engine center axis, and wherein the at least one first flow channel has a first path portion that directs flow in a generally axial direction and a second path portion that directs the flow along a curved flow path that curves in a radially inward direction.

In another embodiment according to any of the previous embodiments, the at least one first flow channel is formed by a reduced portion that is spaced apart from a main body of the static component.

In another embodiment according to any of the previous embodiments, the reduced portion has a cross-section that comprises a tear-drop shape.

In another embodiment according to any of the previous embodiments, the tear-drop shape has a pointed tip and a rounded base, and wherein the inlet is at the pointed tip and the outlet is at the rounded base.

In another embodiment according to any of the previous embodiments, a distal end of a knife positioned upstream of the reduced portion is at a generally same radial location relative to the engine center axis as the pointed tip.

In another embodiment according to any of the previous embodiments, there is at least one support that holds the reduced portion apart from the main body.

In another embodiment according to any of the previous embodiments, the at least one support comprises a plurality of supports that are circumferentially spaced apart from each other.

In another embodiment according to any of the previous embodiments, flow in a first direction through the second flow channel is more restrictive than flow through the second flow channel in a second direction that is opposite of the first direction.

In another featured embodiment, a method includes providing a static component with at least one first flow channel, spacing a labyrinth seal from the static component by a second flow channel, directing flow passing between the labyrinth seal and the static component to have a first portion that travels through the at least one first flow channel and a second portion that travels through the second flow channel, and reintroducing the first portion of the flow into the second flow channel to create a flow restriction.

In another embodiment according to any of the previous embodiments, a method includes rotating the labyrinth seal relative to the static component about an engine center axis and forming the second flow channel as a gap that extends circumferentially about the engine center axis.

In another embodiment according to any of the previous embodiments, the labyrinth seal has an outer circumferential surface with a plurality of knives extending radially outwardly of the outer circumferential surface and being axially spaced apart from each other, and wherein the at least one first flow channel extends circumferentially about the engine center axis, and including forming the at least one first flow channel with a first path portion that directs flow in a generally axial direction and a second path portion that directs the flow along a curved flow path that curves in a radially inward direction.

In another embodiment according to any of the previous embodiments, a method includes forming the at least one first flow channel as a plurality of first flow channels that are axially spaced apart from each other along an inner circumferential surface of the static component, and positioning one first flow channel axially between each pair of adjacent knives.

In another embodiment according to any of the previous embodiments, a method includes forming the at least one first flow channel as a reduced portion that is spaced apart from a main body of the static component, wherein the reduced portion has a cross-section that comprises a teardrop shape.

These and other features may be best understood from the following drawings and specification.

DETAILED DESCRIPTION

Figure 1:
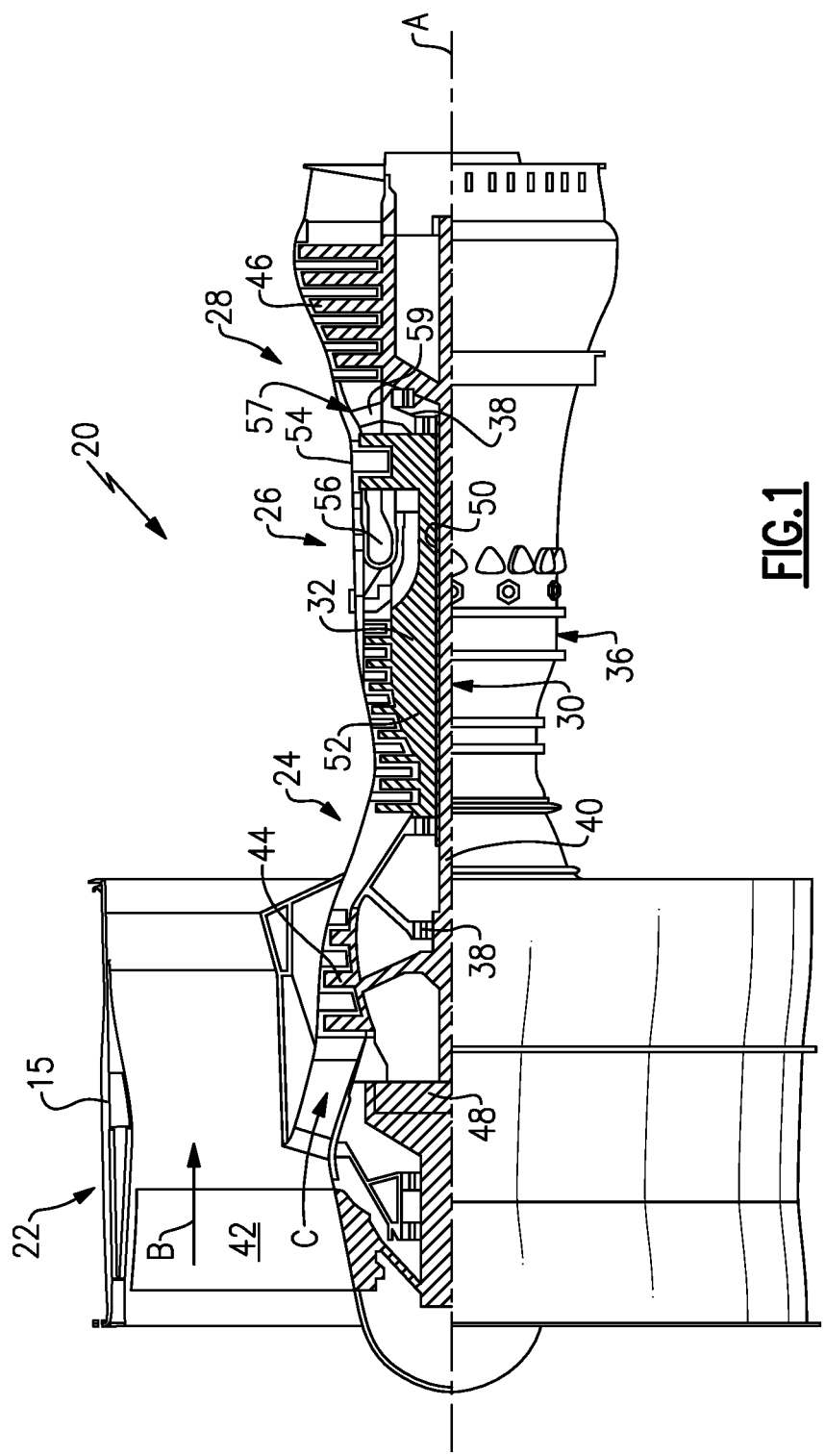
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a first (or low) pressure compressor 44 and a first (or low) pressure turbine 46. The inner shaft 40 is connected to a fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 meters/second).

Figure 2:
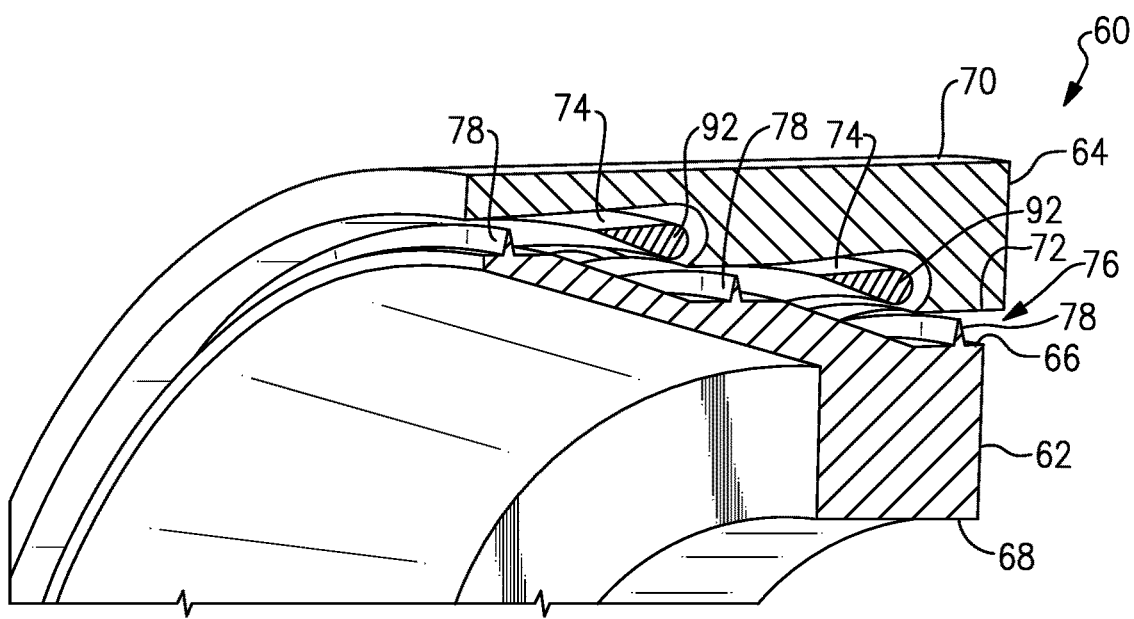
FIG. 2 shows a perspective illustration of a portion of a static structure and a labyrinth seal assembly as used in the gas turbine engine of FIG. 1.

A labyrinth seal assembly 60 is illustrated in FIG. 2. The labyrinth seal assembly 60 could be utilized in a bearing compartment for any of the bearing systems 38 as shown in FIG. 1. The labyrinth seal assembly 60 could also be used for gas path sealing and/or in high temperature areas where carbon seals cannot be used. In one example, a knife edge seal or labyrinth seal 62 rotates relative to a static component 64 about the engine center axis A. The labyrinth seal 62 has an outer circumferential surface 66 and an inner circumferential surface 68. In one example, the static component 64 is a non-rotating component, such as a seal housing for example, that has an outer circumferential surface 70 and an inner circumferential surface 72.

The inner circumferential surface 72 of the static component 64 is spaced from the outer circumferential surface 66 of the seal 62 and includes at least one first flow channel 74. The labyrinth seal 62 is spaced from the static component 64 by a second flow channel 76. The second flow channel 76 comprises a gap that extends circumferentially about the engine center axis A. Flow passing between the labyrinth seal 62 and the static component 64 in a first direction (left-to-right as viewed in FIG. 2) will have a first portion that travels through the first flow channel 74 and a second portion that travels through the second flow channel 76 with the first portion of the flow being reintroduced into the second flow channel 76 to create a flow restriction.

In one example, the labyrinth seal 62 has a plurality of knives 78 extending radially outwardly of the outer circumferential surface 66. The knives 78 extend circumferentially about the engine center axis A and are axially spaced apart from each other in a direction along the axis A. In one example, each knife 78 has a base 80 (FIGS. 4-5) at the outer circumferential surface 66 that extends to a distal end 82 comprising a point or reduced section as compared to the base 80. The knives 78 can have a stepped configuration as shown in FIG. 2 or can comprise a straight line configuration. In one example, the inner circumferential surface 72 of the static component 64 has an abradable material (not shown) that contacts the distal ends 82 of the knives 78 in response to radial excursions of the labyrinth seal 62 relative to the static component 64.

In one example, the static component 64 has the first flow channel 74 formed in the inner circumferential surface 72. In one example shown in FIGS. 4-5, the first flow channel 74 comprises a curved channel having an inlet 84 that receives the first portion of the flow and an outlet 86 that reintroduces the first portion of the flow into the second flow channel 76. In one example, the inlet 84 and outlet 86 are positioned axially between a pair of adjacent knives 78.

Figure 4:
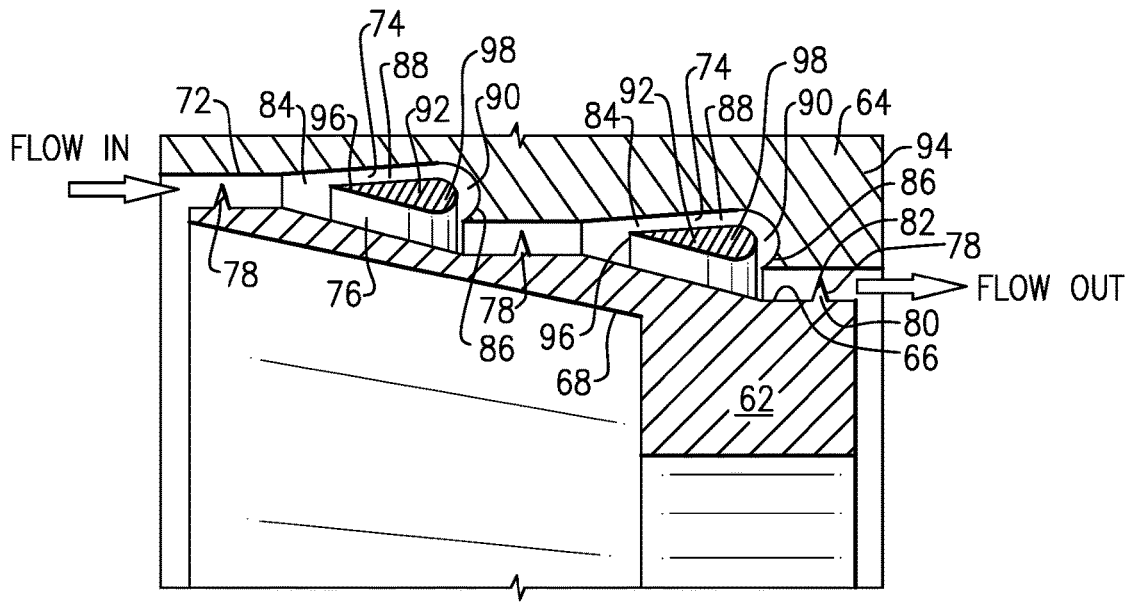
FIG. 4 is a side section view of FIG. 2 showing first and second flow channels.
Figure 5:
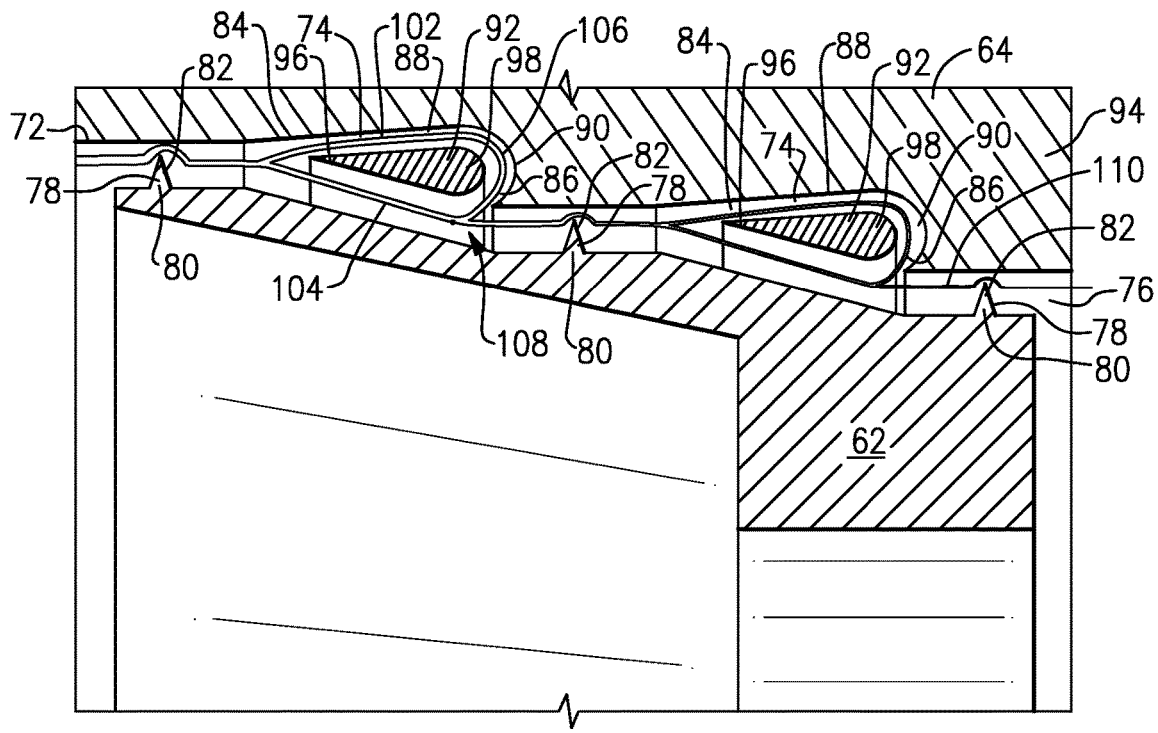
FIG. 5 is a view similar to FIG. 4 but showing a flow path of fluid within the first and second flow channels where a width of the flow lines is representative of a pressure at each location and is intended to represent locations at which restrictions occur.

As best shown in FIGS. 4-5, in one disclosed configuration there are a plurality of first flow channels 74 that are axially spaced apart from each other along the inner circumferential surface 72 of the static component 64. In this example, one first flow channel 74 is positioned axially between each pair of adjacent knives 78. The first flow channels 74 each extend circumferentially about the engine center axis A. In one example, the first flow channel has a first path portion 88 that directs flow in a generally axial direction and a second path portion 90 that directs the flow along a curved flow path that curves in a radially inward direction back toward the second flow channel 76.

Figure 3:
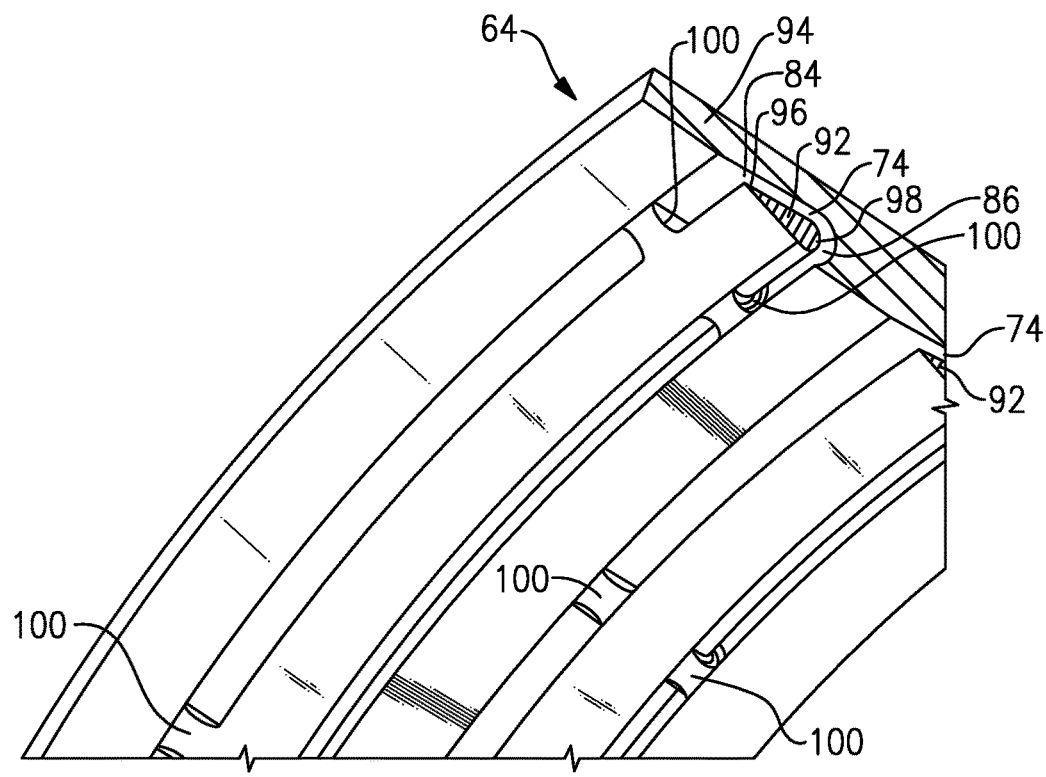
FIG. 3 is a perspective view of an inner circumferential surface of the static structure of FIG. 2.

In one example as shown in FIGS. 2 and 3, the first flow channels 74 are formed by a reduced portion 92 that is spaced apart from a main body 94 of the static component 64. In one disclosed example, the reduced portion 92 has a cross-section that comprises a tear-drop shape. The tear-drop shape has a pointed tip 96 and a rounded base 98. The inlet 84 of the first flow channel 74 is at the pointed tip 96 and the outlet 86 is at the rounded base 98. The reduced portions 92 can be the same size or can vary in size as need to provide desired pressure drops. Sizing of the reduced portions 92, as well as the spacing and/or size of the first 74 and second 76 flow channels is based on boundary conditions, for example.

In one example, at least one support 100 is used to hold the reduced portion 92 in a spaced apart relationship relative to the main body 94. As shown in FIG. 3, the at least one support 100 comprises a plurality of supports 100 that are circumferentially spaced apart from each other about the engine center axis A. In one example, a first support 100 is positioned on one side of the reduced portion 92 and a second support 100 is positioned on an opposite side of the reduced portion 92. The supports 100 can be aligned with each other across the reduced portion 92 as shown, or could be circumferentially offset from each other.

In one example, the distal end 82 of a knife 78 that is positioned upstream of the reduced portion 92 is at a generally same radial location relative to the engine center axis A as the pointed tip 96 of the reduced portion 92. This is best shown in FIGS. 4-5.

FIG. 5 shows the flow passing through the first 74 and second 76 flow channels in a first direction (left-to-right in FIG. 5). There is a pressure reduction in flow at the location of each knife 78. Additionally, fluid passing through the labyrinth knife edge seal 62 will be split between the first 74 and second 76 flow channels. A first portion 102 will enter the first flow channel 74 which comprises an outer diameter curved channel and a second portion 104 will enter the second flow channel 76 which comprises an inner diameter straight channel. The first portion of fluid that travels through the curved first flow channel 74 is turned at 106 and is subsequently reintroduced into the inward second flow channel 76 causing a flow restriction as indicated at 108 and causing a pressure drop. There is a reduced pressure drop at each subsequent reintroduction of fluid from a downstream first flow path 74 as indicated at the thinner flow line 110.

To the contrary, fluid moving in the opposite direction (right-to-left in FIG. 5) can flow more freely. As such, flow in a first direction through the second flow channel 76 is more restrictive than flow through the second flow channel 76 in a second direction that is opposite of the first direction. However, in either flow direction, the flow itself will not change, i.e. the mass flow remains generally constant through the valve.

The subject disclosure thus integrates a Fixed Geometry Passive Check Valve (FGPCV) into a static component such as a labyrinth seal housing to create pressure reduction without moving valve parts. In one example, the FGPCV is made from metal such that wear is not an issue and temperature capability can be quite high. Mass flow is generally constant through the valve, and as mass flow reaches each tear-drop segment, the flow spits into the first 74 and second 76 flow channels with the flow from the first flow channel 74 being redirected back to the second flow channel 76 causing a restriction and pressure drop. Each segment has its own pressure drop and the FGPCV requires mass flow at each segment for the restriction to occur so the valve is never able to seal 100% of the fluid, but with enough segments any leakage can be significantly reduced.

Further, as discussed above, flow in the opposite direction is less restrictive such that the valve can act as a check valve. This can be useful in applications where there may be a desire to have flow in one direction, while impeding flow in an opposite direction, in an environment that may not permit a typical mechanical check valve.

One advantage of such a design can be a reduction of required knife stages and an improvement of the overall efficiency of the seal. Further, the subject disclosure could result in labyrinth seals that require a smaller axial envelope for integration. Additionally, in applications that may experience large radial excursions, the integration of a FGPCV could enable improved sealing capability where the knife edge clearance has to be larger than desired. Due to the fact that there are no contacting moving parts, the FGPCV will not wear out and is highly resistant to debris and contamination.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A gas turbine engine component comprising:
a static component including at least one first flow channel, wherein the static component comprises a non-rotating seal housing; and
a labyrinth seal that rotates relative to the static component about an engine center axis, wherein the labyrinth seal has an outer circumferential seal surface that faces an inner circumferential surface of the non-rotating seal housing, and wherein the labyrinth seal has a stepped configuration such that the outer circumferential seal surface has one or more portions that are radially outward of another portion, and wherein the labyrinth seal is spaced from the static component by a second flow channel such that flow passing between the labyrinth seal and the static component will have a first portion that travels through the at least one first flow channel and a second portion that travels through the second flow channel with the first portion of the flow being reintroduced into the second flow channel to create a flow restriction, and wherein the outer circumferential seal surface has a plurality of knives extending radially outwardly at different radial heights along the stepped configuration and wherein the inlet and outlet of the flow channel are positioned axially between a pair of adjacent knives.

2. The gas turbine engine component according to claim 1, wherein the second flow channel comprises a gap that extends circumferentially about the engine center axis.

3. The gas turbine engine component according to claim 2, wherein the at least one first flow channel is formed in the inner circumferential surface and comprises a curved channel having an inlet that receives the first portion of the flow and an outlet that reintroduces the first portion into the second flow channel.

4. The gas turbine engine component according to claim 3, wherein the at least one first flow channel comprises a plurality of first flow channels that are axially spaced apart from each other along the inner circumferential surface of the static component.

5. The gas turbine engine component according to claim 4, wherein one first flow channel of the plurality of first flow channels is positioned axially between each pair of adjacent knives.

6. The gas turbine engine component according to claim 3, wherein the at least one first flow channel extends circumferentially about the engine center axis, and wherein the at least one first flow channel has a first path portion that directs flow in a generally axial direction and a second path portion that directs the flow along a curved flow path that curves in a radially inward direction.

7. The gas turbine engine component according to claim 3, wherein the at least one first flow channel is formed by a reduced portion that is spaced apart from a main body of the static component.

8. The gas turbine engine component according to claim 7, wherein the reduced portion has a cross-section that comprises a tear-drop shape.

9. The gas turbine engine component according to claim 8, wherein the tear-drop shape has a pointed tip and a rounded base, and wherein the inlet is at the pointed tip and the outlet is at the rounded base.

10. The gas turbine engine component according to claim 9, wherein a distal end of a knife positioned upstream of the reduced portion is at a generally same radial location relative to the engine center axis as the pointed tip.

11. The gas turbine engine component according to claim 7, including at least one support that holds the reduced portion apart from the main body.

12. The gas turbine engine component according to claim 11, wherein the at least one support comprises a plurality of supports that are circumferentially spaced apart from each other, and wherein the plurality of supports includes at least a first support that is positioned on one side of the reduced portion and a second support that is positioned on an opposite side of the reduced portion.

13. The gas turbine engine component according to claim 1, wherein flow in a first direction through the second flow channel is more restrictive than flow through the second flow channel in a second direction that is opposite of the first direction.

14. The gas turbine engine component according to claim 1, wherein the one or more portions includes at least a first portion and a second portion downstream of the first portion, and wherein the outer circumferential seal surface of the first portion is radially outward of the outer circumferential seal surface of the second portion.

15. The gas turbine engine component according to claim 14, including a third portion downstream of the second portion, and wherein the outer circumferential seal surface of the second portion is radially outward of the outer circumferential seal surface of the third portion.

16. The gas turbine engine component according to claim 15, wherein the outer circumferential seal surface includes a first sloped portion connecting the first portion to the second portion, and includes a second sloped portion connecting the second portion to the third portion.

17. The gas turbine engine component according to claim 16, wherein the at least one first flow channel comprises a plurality of first flow channels that are axially spaced apart from each other along the inner circumferential surface of the static component, and wherein one first flow channel is radially overlapping with the first sloped portion and another first flow channel is radially overlapping with the second sloped portion.

18. The gas turbine engine component according to claim 1, wherein the labyrinth seal has a plurality of knives extending radially outwardly of the outer circumferential seal surface and being axially spaced apart from each other, and wherein each knife has a base at the outer circumferential seal surface that extends to a distal end comprising a point.

19. The gas turbine engine component according to claim 18, wherein each portion includes one set of knives that extend circumferentially about the engine center axis.

20. A method comprising:
providing a static component with at least one first flow channel;
spacing a labyrinth seal from the static component by a second flow channel;
rotating the labyrinth seal relative to the static component about an engine center axis and forming the second flow channel as a gap that extends circumferentially about the engine center axis, and wherein the static component comprises a non-rotating seal housing, and wherein the labyrinth seal has an outer circumferential seal surface that faces an inner circumferential surface of the non-rotating seal housing;
wherein the outer circumferential seal surface has a plurality of knives extending radially outwardly of the outer circumferential seal surface and being axially spaced apart from each other, and wherein the at least one first flow channel extends circumferentially about the engine center axis, and including forming the at least one first flow channel with a first path portion that directs flow in a generally axial direction and a second path portion that directs the flow along a curved flow path that curves in a radially inward direction;
forming the at least one first flow channel as a reduced portion that is spaced apart from a main body of the static component, wherein the reduced portion has a cross-section that comprises a tear-drop shape, and forming a plurality of supports that are circumferentially spaced apart from each other and that hold the reduced portion apart from the main body, and wherein the plurality of supports includes at least a first support that is positioned on one side of the reduced portion and a second support that is positioned on an opposite side of the reduced portion;
directing flow passing between the labyrinth seal and the static component to have a first portion that travels through the at least one first flow channel and a second portion that travels through the second flow channel; and
reintroducing the first portion of the flow into the second flow channel to create a flow restriction.

21. The method according to claim 20, including forming the at least one first flow channel as a plurality of first flow channels that are axially spaced apart from each other along an inner circumferential surface of the static component, and positioning one first flow channel axially between each pair of adjacent knives, and wherein each knife has a base at the outer circumferential seal surface that extends to a distal end comprising a point.

22. The method according to claim 21, including forming the labyrinth seal with a stepped configuration such that the outer circumferential seal surface has one or more portions that are radially outward of another portion, and wherein each portion includes one set of knives that extend circumferentially about the engine center axis.

* * * * *